UNITED STATES PATENT OFFICE.

OSCAR BALLY, OF LUDWIGSHAFEN, GERMANY, ASSIGNOR TO THE BADISCHE ANILIN AND SODA FABRIK, OF SAME PLACE.

MORDANT-DYEING COLORING-MATTER.

SPECIFICATION forming part of Letters Patent No. 654,505, dated July 24, 1900.

Application filed January 9, 1900. Serial No. 879. (Specimens.)

*To all whom it may concern:*

Be it known that I, OSCAR BALLY, doctor of philosophy, a citizen of the Swiss Republic, residing at Ludwigshafen-on-the-Rhine, in the Kingdom of Bavaria, Germany, have invented new and useful Improvements in Mordant-Dyeing Coloring-Matters Fast to Milling, of which the following is a specification.

My present invention relates to the production of new mordant-dyeing coloring-matters which are especially characterized by their complete fastness to milling. The initial materials that I use are the more greenish brands of the coloring-matters known in commerce as "anthracene-blue" and also the similar coloring-matters known in part by other names. The said coloring-matters result, for instance, from the treatment of dinitro-anthraquinones with fuming sulfuric acid and sulfur, with or without the addition of boracic acid. According to my present invention I treat these products with ammonia and a fixed alkali—for instance, caustic soda—and this treatment is effected at a high temperature under the influence of pressure. The pressure may vary from five to twenty atmospheres; but according as the temperature or the concentration of the ammonia, or both, employed increases the pressure may exceed that.

The following examples will serve to further illustrate the nature of the invention and the manner in which it is best carried into practical effect. The parts are by weight.

Example 1: Mix together about one hundred (100) parts of the coloring-paste known in commerce as "anthracene-blue G," equal to ten (10) parts dry coloring-matter and twenty (20) parts solid caustic soda. Stir into this mixture about one hundred (100) parts of ammonia-water, (containing about twenty per cent. $NH_3$.) Introduce the mixture into an autoclave and raise the temperature to about 150° centigrade for about seven hours. Then allow to cool, dilute the melt with water, precipitate the coloring-matter with an acid, filter, and wash. The coloring-matter is preferably used for dyeing in the form of a paste.

Example 2: Mix together about one hundred (100) parts of a ten-per-cent. paste of the coloring-matter obtained according to the example of the Letters Patent No. 617,686 and twenty (20) parts solid caustic soda with one hundred (100) parts of ammonia-water, (containing about twenty per cent. $NH_3$.) Heat the mixture in an autoclave for about seven hours at a temperature of 150° centigrade and work up the coloring-matter in the manner described in the foregoing example.

The new coloring-matter is characterized by the following properties: In the dry state it is a dark-colored powder with a bronzy luster. It is but slightly soluble even in boiling water. It dissolves in sodium carbonate and caustic-soda solution, giving a pure-blue color. In sodium acetate it dissolves, giving a violet-blue color. The alcoholic solution is violet. It is with difficulty soluble in aniline, and the solution is blue, and the solution in concentrated sulfuric acid is yellow red. In its tinctorial properties the new coloring-matter differs from the initial material in possessing a considerably-higher degree of fastness against milling, while the shade remains almost the same.

Now what I claim is—

1. The process for the manufacture of new mordant-dyeing coloring-matter fast to milling, by treating anthracene-blue coloring-matters with ammonia and a caustic alkali at a high temperature under pressure.

2. As a new article of manufacture the new blue mordant-dyeing coloring-matter which can be obtained by treating a greenish anthracene-blue dye with ammonia and a caustic alkali under pressure at a high temperature, and which yields greenish-blue shades on chrome-mordanted wool which are very fast to milling and which yields a yellow-red solution in concentrated sulfuric acid, all substantially as described.

In testimony whereof I have hereunto set my hand in the presence of two subscribing witnesses.

OSCAR BALLY.

Witnesses:
ERNEST E. EHRHARDT,
PAUL JULIUS.